United States Patent
Kobayashi et al.

(10) Patent No.: US 7,627,874 B2
(45) Date of Patent: Dec. 1, 2009

(54) MOVEMENT RESTRICTION DEVICE, MOVEMENT RESTRICTION METHOD, AND PROCESSING DEVICE

(75) Inventors: Katsuyuki Kobayashi, Tokorozawa (JP); Katsuhiro Onodera, Tokorozawa (JP); Shogo Sato, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 425 days.

(21) Appl. No.: 11/665,377

(22) PCT Filed: Oct. 13, 2005

(86) PCT No.: PCT/JP2005/018874

§ 371 (c)(1), (2), (4) Date: Apr. 13, 2007

(87) PCT Pub. No.: WO2006/041131

PCT Pub. Date: Apr. 20, 2006

(65) Prior Publication Data

US 2008/0189728 A1  Aug. 7, 2008

(30) Foreign Application Priority Data

Oct. 14, 2004  (JP)  ............................. 2004-300652

(51) Int. Cl.
*G11B 17/03* (2006.01)
(52) U.S. Cl. ................................... 720/607
(58) Field of Classification Search ................ 720/607, 720/602, 601, 613, 605
See application file for complete search history.

(56) References Cited

U.S. PATENT DOCUMENTS 5,933,408 A * 8/1999 Park et al. ................... 720/706
6,141,310 A * 10/2000 Tanaka et al. ............... 720/620
2003/0235144 A1 * 12/2003 Eum et al. ................... 369/291
2006/0048173 A1 * 3/2006 Lee et al. ..................... 720/658

FOREIGN PATENT DOCUMENTS

| JP | 5-342732 | 12/1993 |
|---|---|---|
| JP | 10-283710 | 10/1998 |
| JP | 2002-230955 | 8/2002 |

* cited by examiner

*Primary Examiner*—Allen T Cao
(74) *Attorney, Agent, or Firm*—Kratz, Quintos & Hanson, LLP

(57) ABSTRACT

An elastic restriction section (15g), formed in a substantially cylindrical configuration and having the vertical axis is provided to protrude on one side of a rear end section of a chassis (15) formed of a synthetic resin. The chassis constitutes a case body for housing a main body that performs processing of reading or recording of an optical disk. The elastic restriction section (15g) is divided into three elastic members that are elastically deformable into a diameter-reduced state, and provided to protrude at a position substantially diagonally opposite to an engagement position of a movement gear (63) of an open/close drive unit (60), the open/close drive unit (60) advancing/retreating a disk tray (50) carrying the optical disk. In the disk tray (50), an engaging recess (51e) is provided to be engaged with the elastic restriction section (15g) at a home position. Even when vibration is applied to the disk tray (50) while the optical disk is processed, the vibration is absorbed by the elastic restriction section (15g) that engages with the engaging recess (51e) to apply restoring force in different directions, thereby suppressing noise.

11 Claims, 12 Drawing Sheets

MOVEMENT RESTRICTION DEVICE, MOVEMENT RESTRICTION METHOD, AND PROCESSING DEVICE

TECHNICAL FIELD

The present invention relates to a movement restriction device, a movement restriction method, and a processing device for restricting a movement of a movable transfer unit that transfers an object to be transferred, such that a processing portion arranged on a chassis processes the object.

BACKGROUND ART

Conventionally, disk devices have been widely used that include a processing portion which rotates a disc recording medium such as a compact disc (CD), a digital versatile disc (DVD) or a hard disk (HD) to read or record information as appropriate. For such disk devices, an arrangement is known to be used, in which a tray is provided to transfer a disc recording medium (see, for example, Patent Document 1).

In the device as disclosed in Patent Document 1, ten stages of tray guiding portions for guiding the movement of a rectangular-thin-plate-shaped disk tray that retains an optical disk are provided in a rectangular outer casing of a tray housing body such that eleven disk trays can be housed in the tray housing body. Further, on a back wall provided on a side opposite to a tray insertion opening of the outer casing, an elastic member and a buffering portion are provided. The elastic member is adapted to be engaged with a locking portion cut out inwardly on one side of the rear end of the disk tray and to retain the disk tray at an housing position of the tray housing body, and the buffering portion which is formed of an elastic material is adapted to enter a cutout portion provided on the other side of the rear end of the disk tray and to protect the disk tray and an optical disk retained thereby. The optical disk transferred by the disk tray is interposed between a disk table and a disk clamper. In this state, the optical disk is rotated, so that recording or reproducing is effected by means of an optical pickup.

[Patent Document 1] JP-A-10-283710 (the left-hand column of page 4 to the right-hand column of page 18)

DISCLOSURE OF THE INVENTION

Problem to be Solved by the Invention

However, in the conventional disk device as disclosed in Patent Document 1 described above, a clearance for movement at the time of transfer is provided between the disk tray for transferring the optical disk and the tray housing body. An exemplary problem in this arrangement is that vibration occurs when the optical disk is rotated for recording or reproducing and that the vibration can generate noises.

In view of such a problem and the like, it is therefore an object of the present invention is to provide a movement restriction device, a movement restriction method, and a processing device for suppressing vibration of the transfer unit.

Means for Solving the Problem

A movement restriction device according to an aspect of the present invention is the movement restriction device that restricts movement of a transfer unit when the transfer unit is moved onto a chassis, the movement restriction device being provided in a processing device, the processing device including: the chassis; the transfer unit movably arranged on the chassis and adapted to transfer an object to be transferred onto the chassis; and a processing portion arranged on the chassis to process the object to be transferred that has been transferred onto the chassis by the transfer unit, the movement restriction device including: an engaging portion provided in either one of the chassis or the transfer unit; and a locking portion provided on the other one of the chassis or the transfer unit, the locking portion being detachably engaged with the engaging portion such that a restoring force due to elastic deformation is applied to the transfer unit relative to the chassis in a moving direction of the transfer unit and in at least one direction crossing the moving direction, when the transfer unit is moved to a processing position where the object to be transferred can be processed by the processing portion, the locking portion restricting the movement of the transfer unit relative to the chassis.

A processing device according to another aspect of the present invention is the processing device including: a chassis; a transfer unit movably arranged inside the chassis and adapted to transfer an object to be transferred into and out of the chassis; a processing portion arranged inside the chassis and adapted to process the object to be transferred that has been transferred into the chassis; and the movement restriction device according to the present invention.

A movement restriction method according to still further aspect of the present invention is the movement restriction method, that restricts movement of a transfer unit when the transfer unit is moved onto a chassis of a processing device, the processing device comprising: the chassis; the transfer unit movably arranged on the chassis and adapted to transfer an object to be transferred onto the chassis; and a processing portion arranged on the chassis to process the object to be transferred that has been transferred onto the chassis by the transfer unit, the movement restriction method including steps of: bringing the chassis and the transfer unit into contact with each other in a state where the transfer unit has moved the object to be transferred to a processing position on the chassis at which the object to be transferred is processed by the processing portion; applying a restoring force due to elastic deformation to the transfer unit relative to the chassis in a moving direction of the transfer unit and in at least one direction crossing the moving direction; and restricting the movement of the transfer unit relative to the chassis.

EXPLANATION OF CODES

Figure 1:
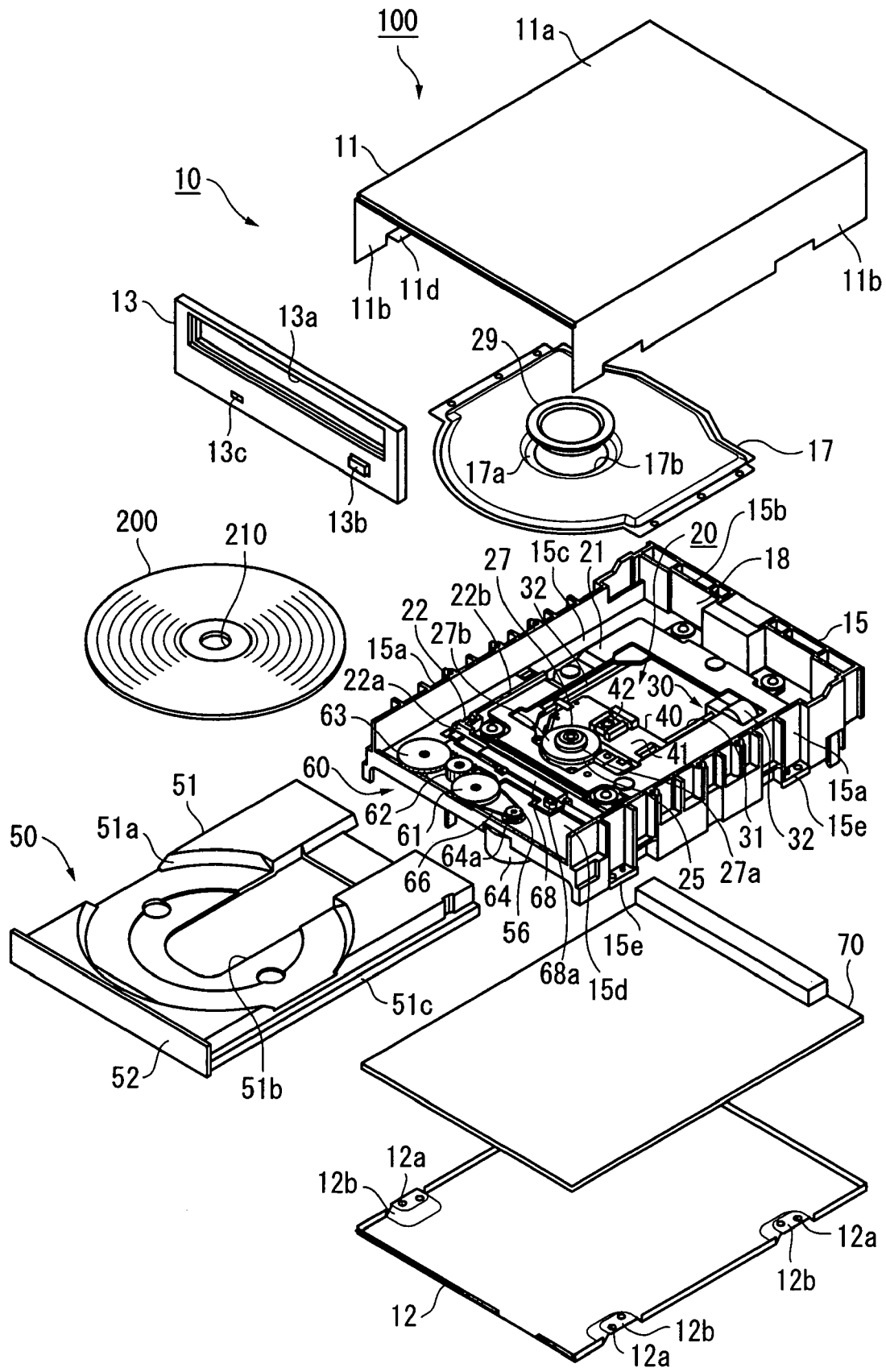
FIG. 1 is an exploded perspective view schematically showing the arrangement of a disk drive according to a first embodiment of the present invention.

15 . . . chassis
15g, 80, 97 . . . elastic restriction section as locking portion capable of functioning also as engaging portion
15g1, 80a, 97a . . . elastic member as one of elastic member
20 . . . main body as processing portion
50 . . . disk tray as transfer unit
51e, 81, 95 . . . engaging recess as engaging portion capable of functioning also as locking portion
60 . . . open/close drive unit as moving unit
96 . . . elastic tongue portion as elastic member
85a, 90 . . . engaging portion
100 . . . disk drive as processing device
200 . . . optical disk as disc recording medium which is also an object to be transferred

BEST MODE FOR CARRYING OUT THE INVENTION

In the following, a first embodiment of the present invention will be described with reference to the drawings. In this embodiment, a disk drive is explained as being an exemplary disk device which is a processing device for recording and reading information on and from an optical disk as a disc recording medium which is also an object to be transferred. The present invention is applicable to any disk device that records or reads various kinds of information on or from a disc recording medium, and examples of such a disk device may be a portable disk device, or otherwise may be a reproducing apparatus, a recording apparatus, or a game machine which is equipped with a disk drive and records or reproduces, for instance, video data. The disc recording medium usable is not restricted to an optical disk, and may be an magnetic disk, a magneto-optical disk, etc. Further, while in the following description the disc recording medium is attached such that its plane extends substantially in the horizontal direction, the present invention is also applicable to a case in which the disc recording medium is attached such that its plane extends substantially in the vertical direction. The object to be transferred is not restricted to the disc recording medium. For example, the object may also be a cylindrical recording medium having a recording surface on the outer peripheral surface thereof. In addition, the processing device is not restricted to a device performing the operation of recording or reading information on or from a recording medium. The present invention is also applicable to a device performing any other operation such as transferring a workpiece as an object to be transferred to a machining portion as the processing portion for the machining.

In FIG. 1, reference numeral 100 indicates a disk drive; the disk drive 100 has a casing 10 formed of metal. The casing 10 has an upper case 11 that is open on the lower side and the front side thereof, a lower case 12 closing the lower side of the upper case 11, and a decorative plate 13 closing the front side of the upper case 11.

The upper case 11 includes a top plate portion 11a of a rectangular flat plate shape, side plate portions 11b formed continuously with the upper case 11 and bending substantially at right angles along both longitudinal side edges, and an end plate portion (not shown) formed continuously with the upper case 11 and bending substantially at right angels in the same direction with the side plate portions 11 along one end edge constituting the rear end portion in the longitudinal direction of the top plate portion 11a. With this arrangement, the lower side and the front side of the upper case 11 are open. At the lower end edges of the side plate portions 11b of the upper case 11, mounting members 11d is provided at a plurality of positions, e.g., at two positions. The mounting members 11d bend inwardly and have screw holes (not shown).

The lower case 12 is formed in a rectangular flat plate shape that is substantially the same as the top plate portion 11a of the upper case 11. In the lower case 12, mounting dowels 12b having screw holes 12a is provided, and the mounting dowels 12b bend so as to upwardly bulge in correspondence with the mounting members 11d of the top plate portion 11a.

The decorative plate 13 is formed of a synthetic resin such as acrylonitrile-butadiene-styrene (ABS), substantially in a plate shape. At the forward end, the decorative plate 13 has engaging claws (not shown) that protrudes substantially perpendicularly from one surface of the decorative plate 13. The engaging claws detachably engage with the side plate portions 11b of the upper case 11 and the lower case 12. Further, the decorative plate 13 has a opening 13a of a longitudinal shape extending in the longitudinal direction (i.e., a horizontal direction). Additionally, the decorative plate 13 is provided with a switch operating portion 13b and an operation check window 13c.

Figure 2:
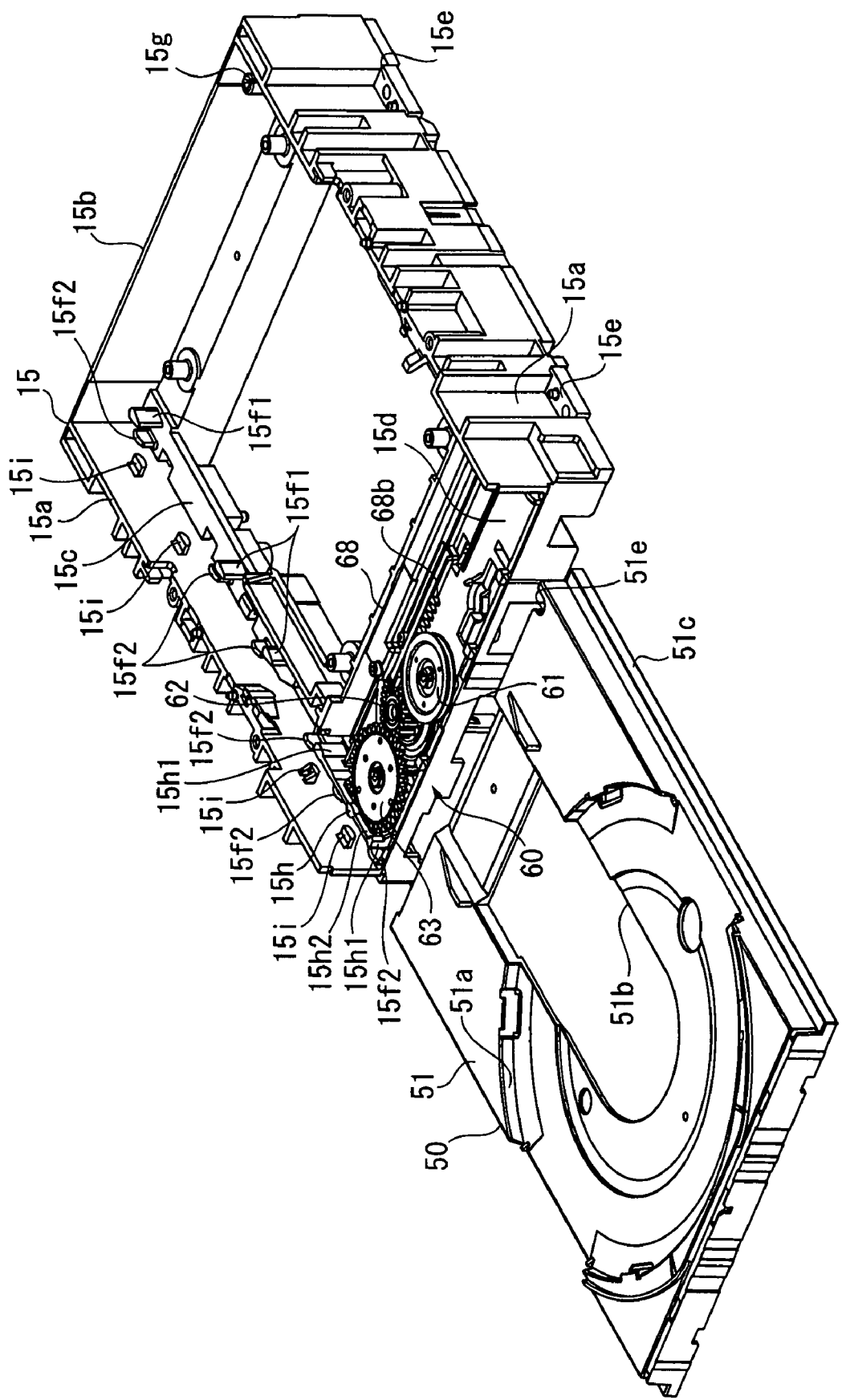
FIG. 2 is an exploded perspective view showing a chassis in which an open/close drive unit according to the first embodiment is provided and a disk tray.
Figure 3:
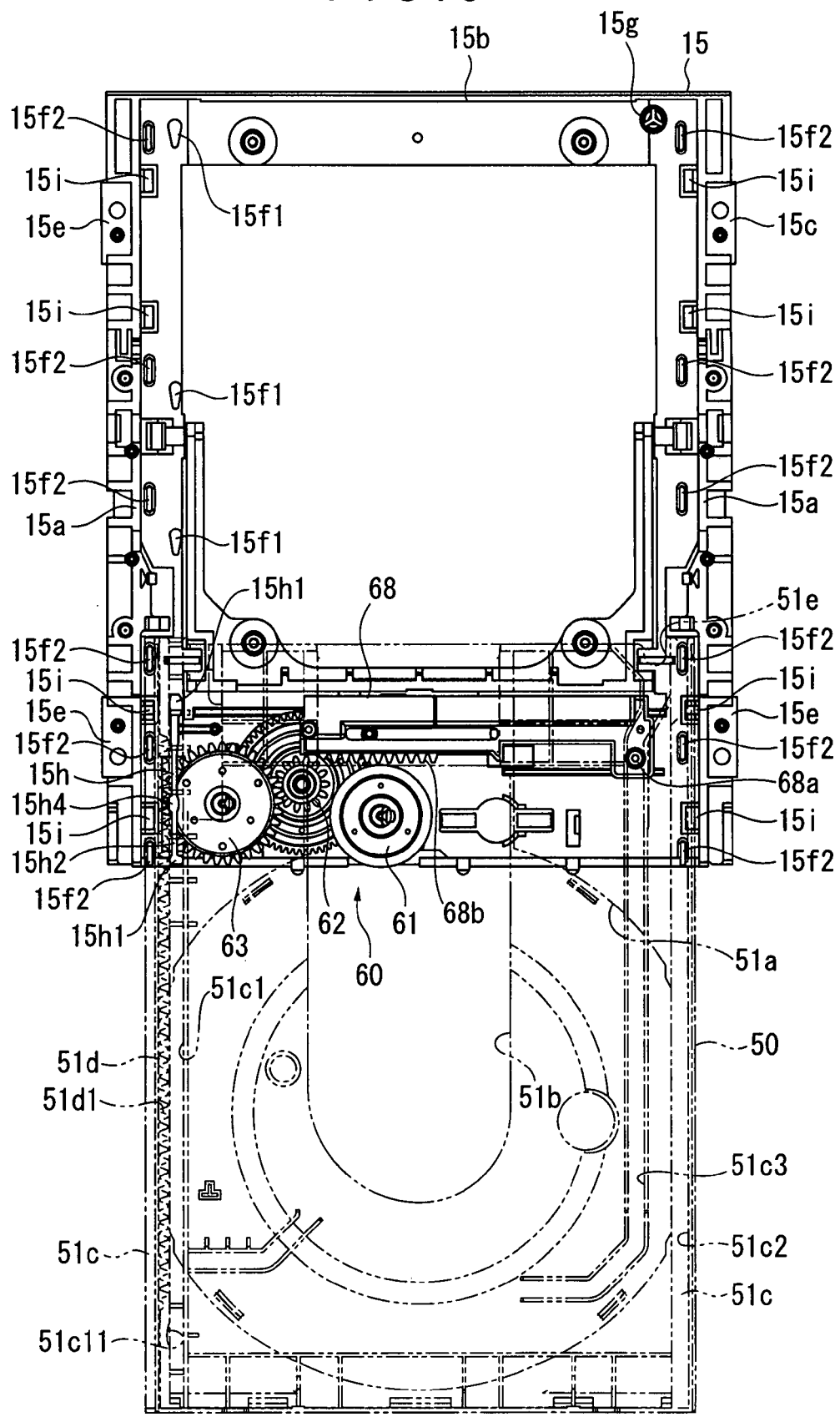
FIG. 3 is a plan view showing the chassis in which the opening/closing drive unit according to the first embodiment is provided in relation to the disk tray.

The casing 10 also contains a chassis 15 which is made of a elastically deformable material having rigidity and insulating property, and such a material may be a synthetic resin such as ABS. The chassis 15 is located in the interior of the casing 10 formed by the upper case 11, the lower case 12, and the decorative plate 13, and the chassis 15 defines an housing space 18 inside. As shown in FIGS. 1 through 3, the chassis 15 has side surface portions 15a closely contacting the inner surfaces of the side plate portions 11b of the upper case 11, an end surface portion 15b closely contacting the inner surface of the end plate portion of the upper case 11, a support rib 15c protruding inwardly from the inner sides of the side surface portions 15a and the end surface portion 15b, and an opening/closing drive arrangement portion 15d bridging the front end portions of the side surface portions 15a opposing to the end surface portion 15b. and the chassis 15 is formed as a substantially rectangular frame with both axial ends open. The chassis 15 is further provided with mounting rib portions 15e on the side surface portions 15a, and the mounting rib portions 15e is held between the mounting members 11d of the upper case 11 and the mounting dowels 12b of the lower case 12 and fixed by screws.

Further, a plurality of guide ribs 15f1, 15f2 are provided on the support rib 15c of the chassis 15, and protrude from the support rib 15c. The guide ribs 15f1, 15f2 protruding from the support rib 15c are plurally provided to the portions of the support rib 15c that protrude inwardly from the side surface portions 15a of the chassis 15 so as to be linearly arrayed in the longitudinal direction of the chassis 15. The guide ribs 15f1, 15f2 are arranged to be positioned mutually interposing an interval of a predetermined distance in the width direction of the chassis 15. The guide ribs 15f1 have a predetermined height dimension and a shape of columns whose cross-sectional surface is shaped like a tear-drop. The shape of a tear-drop is gradually reduced in width toward the front side, i.e., the opening/closing drive arrangement portion 15d. The guide ribs 15f2 is arranged to have a predetermined height dimension smaller than that of the guide ribs 15f1 and the forward end edges protruding longitudinally in a thin-and-long-wall-like fashion are of a substantially arcuate configuration.

Figure 4:
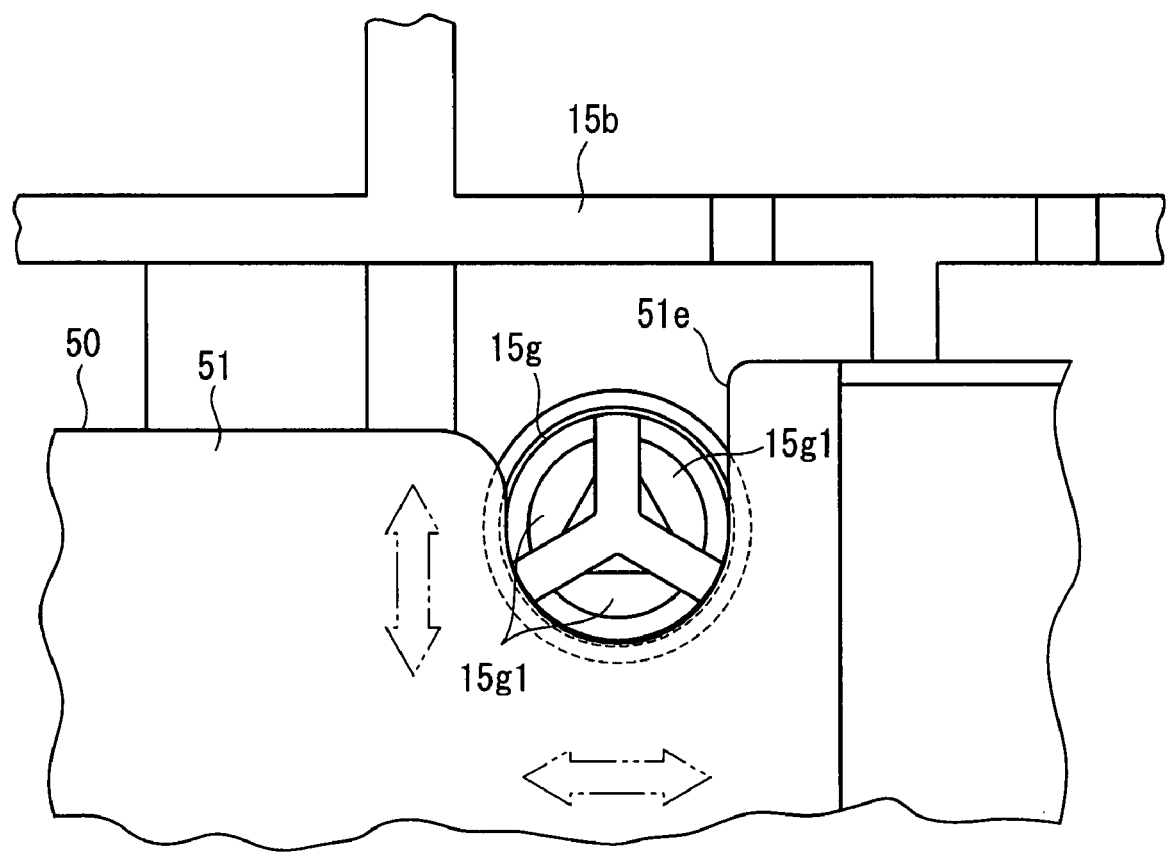
FIG. 4 is a partially cutaway plan view illustrating how an engaging recess is engaged with an elastic restriction section according to the first embodiment.
Figure 5:
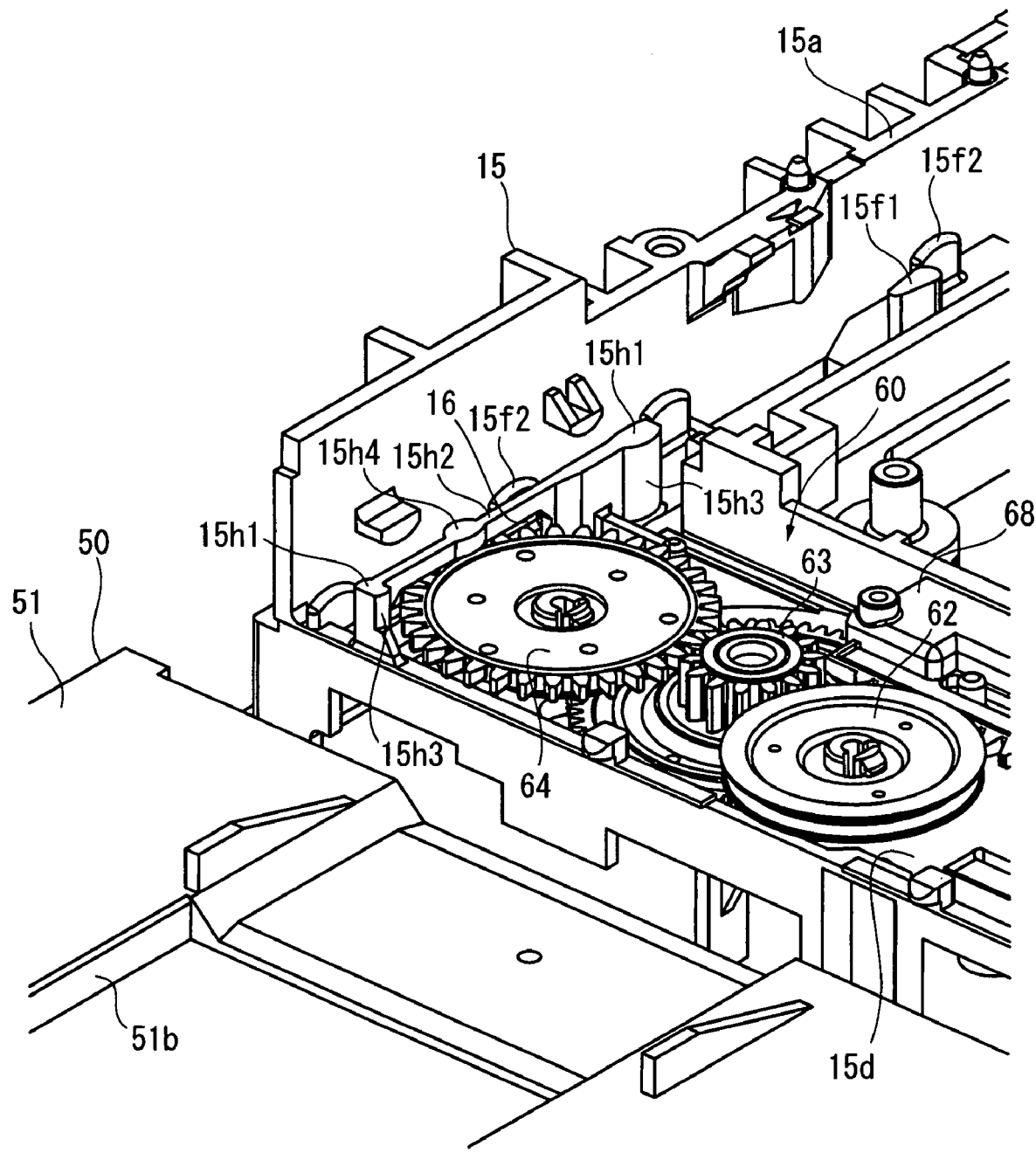
FIG. 5 is a partially cutaway exploded perspective view illustrating a region adjacent to an elastic guide portion of the chassis in which the opening/closing drive unit according to the first embodiment is provided and the disk tray.
Figure 6:
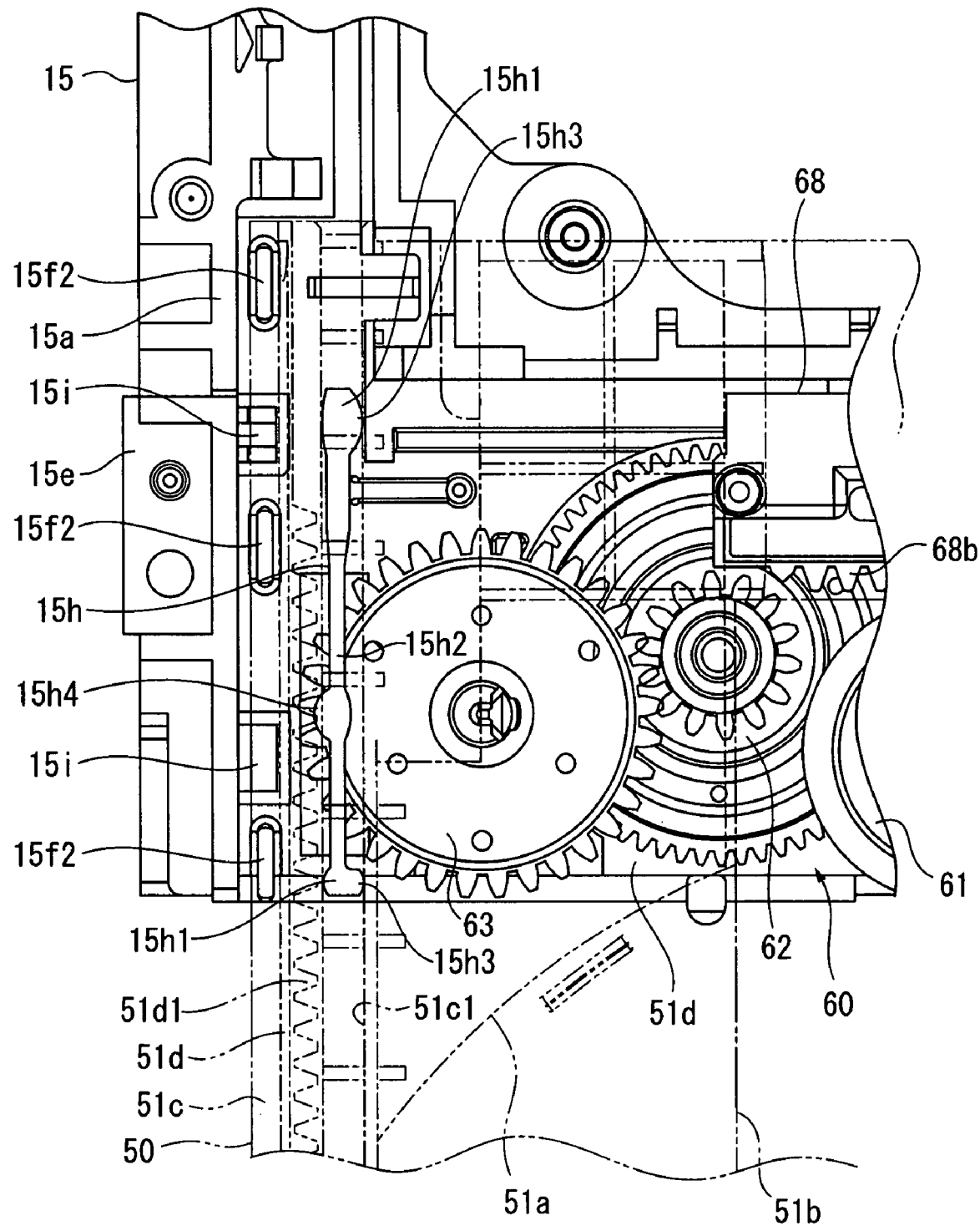
FIG. 6 is a partially cutaway plan view showing the region adjacent to the elastic guide portion of the chassis in which the opening/closing drive unit according to the first embodiment is provided in relation to the disk tray.
Figure 7:
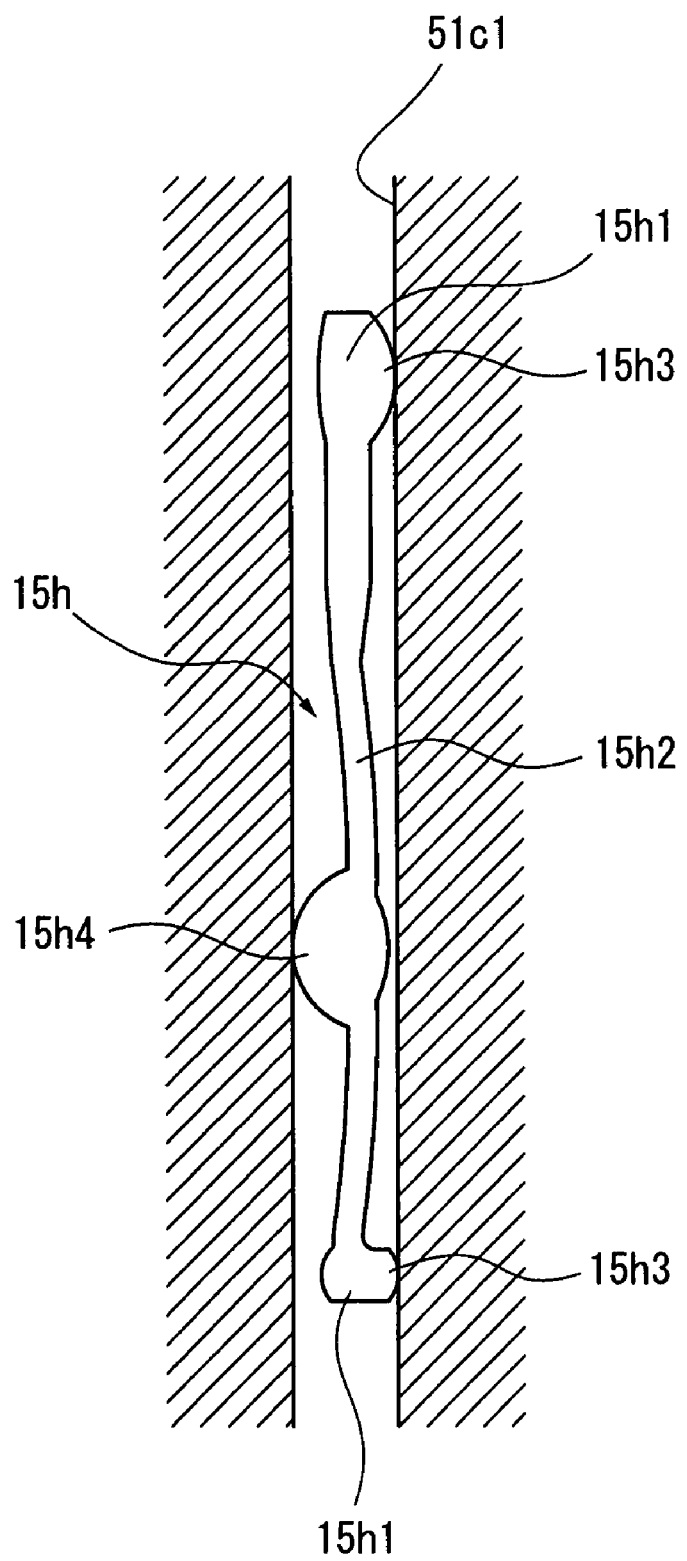
FIG. 7 is an explanatory illustration showing how the elastic guide portion according to the first embodiment is engaged with a first engaging recessed groove.

An elastic restriction section 15g as a locking portion capable of functioning also as an engaging portion is provided in a protruding configuration and positioned at the base end portion facing the end surface portion 15b on one side in the longitudinal direction of the chassis 15 (on the right-hand side as seen in FIGS. 2 and 3). As shown in FIGS. 2 to 4, the elastic restriction section 15g is formed continuously with the chassis 15, and the outer peripheral surface is formed in a substantially columnar configuration (i.e., cylindrical configuration). The elastic restriction section 15g protrudes such that its axial direction coincides with the thickness direction of the support rib 15c (i.e., the direction substantially perpendicular to the plane on the support rib 15c). Additionally, the elastic restriction section 15g is divided substantially uniformly into three portions in the peripheral direction to provide three elastic members 15g1. The elastic members 15g1 can be elastically deformed in a mutually approaching direction. Through elastic deformation of the elastic members 15g1, the elastic restriction section 15g can be reduced in diameter. The elastic restriction section 15g is divided and formed such that one of the elastic members 15g1 is substantially opposed to the opening/closing drive arrangement portion 15d situated on the front side. Specifically, the elastic restriction section is divided and formed so as to be opposed to the forward end portion of a disk tray 50 (described below) when moved to retreat. It should be noted that the elastic restriction section 15g is molded integrally with the chassis 15 and provided with a draft taper so as to be gradually reduced in diameter toward the forward end.

An elastic guide portion 15h is provided continuously from the chassis 14 to the opening/closing drive arrangement portion 15d of the chassis 15 in a protruding configuration, and the elastic guide portion is situated on the other longitudinal side of the chassis 15 (i.e., the left-hand side as seen in FIGS. 2 and 3) and aligning with the guide ribs 15f1. As shown in FIGS. 2, 3 and 5-7, the elastic guide portion 15h is shaped like a longitudinal wall extending in the longitudinal direction of the chassis 15 and configured like a bridge. The elastic guide portion 15h has a longitudinal drive transmission through-hole 16 on the base end portion of the opening/closing drive arrangement portion 15d at the intermediate portion of in the longitudinal direction. Specifically, the elastic guide portion 15h has a pair of support legs 15h1 protruding substantially perpendicularly toward the opening/closing drive arrangement portion 15d with the legs mutually opposed in the longitudinal direction, and a band-like elastic portion 15h2 bridging the forward end portions of the support legs 15h1 and capable of elastic deformation in the width direction of the chassis 15, i.e., in the thickness direction thereof. At the forward ends of the support legs 15h1, first bulging portions 15h3 are respectively provided that bulges toward the right-hand side, which is one side with respect to the horizontal direction (i.e., the width direction crossing the longitudinal direction of the chassis 15). Substantially at the center of the elastic portion 15h2, a second bulging portion 15h4 is provided that bulges toward left-hand side, the other longitudinal side of the chassis 15 (i.e., the elastic portion 15h2 bulges in the direction opposite to the bulging direction of the first bulging portions 15h3).

On the side surface portions 15a of the chassis 15, restricting claws 15i are provided in an inwardly protruding configuration. The restricting claws 15i are formed such that the lower surfaces of the claws opposed to the support rib 15c bulge with the center curved with respect to the advancing/retreating direction, which is the moving direction of the disk tray 50. Further, the plurality of restricting claws 15i protrude such that the distance between the forward ends of their lower surfaces and the upper surface of the support rib 15c is a predetermined distance. Then, the restricting claws 15i are provided in a plurality such that a predetermined distance is kept between the front end of the lower surface of the claws and the upper surface of the support rib 15c of the cassis 15. At least one of the restricting claws 15i is provided at a position in close proximity to the elastic guide portion 15h, specifically positioned on one side of the elastic guide portion 15h with respect to the width direction of the chassis 15.

A main body 20 as the processing portion is also arranged in the chassis 15. The main body 20 has a base 21 formed, for example, of metal in a flat-frame-like configuration. The base 21 is mounted to the support rib 15c protruding from the end surface portion 15b of the chassis 15 with one edge of the base adapted to vertically rotate while the other edge thereof being fixed by screws. A rotation guide portion 22 is integrally mounted to one edge of the base 21. The rotation guide portion 22 has a mounting retainer 22a of a longitudinal shape extending along one edge of the base to which the base 21 is mounted integrally by screws, and a pair of rotation arms 22b integrally provided with both end portions of the mounting retainer 22a to protrude substantially perpendicularly therefrom with the forward ends rotatably supported by the support rib 15c protruding from the side surface 15a of the chassis 15. The rotation of the base 21 is guided the rotation guide portion 22.

The base 21 is further arranged with a rotatable disk rotation driver 25 as a rotation driver positioned at one edge side. The disk rotation driver 25 has an electric moving motor 26 such as a spindle motor and a turntable 27 as one holding member provided integrally with the output shaft (not shown) of the electric moving motor 26. The turntable 27 has a substantially columnar rotation shaft 27a to be inserted into an axial hole 210 formed at the center of an optical disk 200, and a flange portion 27b to protrude in a flange-like fashion from the outer peripheral surface of the rotation shaft 27a on which the peripheral edge of the axial hole 210 of the optical disk 200 is placed. A magnet (not shown) is embedded in the forward end portion of the rotation shaft 27a of the turntable 27.

The base 21 also includes a processor moving unit 30. The processor moving unit 30 has a pair of guiding shafts 31 and a electric moving motor 32. The pair of guiding shafts 31 are arranged to have an axial direction that is directed from the other edge where the base 21 is rotatably supported to one edge of the rotation side. The electric moving motor 32 is arranged such that the axial direction of the output shaft (not shown) is directed along the axial direction of the guiding shafts 31. A spiral engagement groove (not shown) is provided in the outer peripheral surface of the output shaft of the electric moving motor 32.

The processor moving unit 30 further contains a recording/reproducing section 40. The recording/reproducing section 40 has a movement holder 41 retained so as to bridge the pair of guiding shafts 31. The movement holder 41 is equipped with a retaining portion (not shown) through which the guiding shafts 31 are movably passed and a movement restricting claw (not shown) to be engaged with the engagement groove of the output shaft of the electric moving motor 32. In addition, the movement holder 41 of the recording/reproducing section 40 is provided with a pickup 42 having a light source (not shown), a lens converging the light from this light source, and an optical sensor (not shown) detecting the light reflected from the optical disk 200.

The inner side of the chassis 15 is provided with a disk tray 50 as a transfer unit movable in the horizontal direction above the support rib 15c. As shown in FIGS. 1 to 3, the disk tray 50 has a tray portion 51, which is a tray formed, for example, of synthetic resin, in a substantially rectangular plate-like configuration. On one surface of the tray portion 51, a placing recess 51a is provided to house the optical disk 200. The placing recess 51a is a substantially circular recess upwardly diverging and has a planar portion on which the optical disk 200 can be placed. Also in the tray portion 51, an opening 51b in the form of a longitudinal cutout is formed. The opening 51b is open in correspondence with the disk rotation driver 25 and the recording reproducing unit 40 of the main body 20 from substantially the center of the placing recess 51a over the outer peripheral edge thereof, and extends in the longitudinal direction of the tray portion 51 such that the moving pickup 42 is allowed to enter the tray portion 51 without contacting. The opening 51b is formed by cutout to extend along the radial and longitudinal direction of the placing recess 51a such that the pickup 42 is prevented from contacting the tray portion 51 even when the pickup is positioned in correspondence with the outermost periphery of the optical disk 200 when reading and recoding information in the outermost periphery of the optical disk 200 housed in the housing space 18. In addition, a longitudinal-plate-shaped window closing plate portion 52 formed of the same material as the decorative plate 13 is detachably mounted to one edge on the front side in the longitudinal direction of the tray portion 51. The window closing plate portion 52 is adapted to close the window portion 13a of the decorative plate 13 of the case body 10.

Further, guide flange portions 51c are provided respectively on both sides in the longitudinal direction of the tray portion 51 which protrude sidewise in a flange-like fashion from the lower end edges. The width dimension of the tray portion 51 as measured between the forward ends of the guide flange portions 51c is substantially equal to or slightly smaller than the width dimension as measured between the inner surfaces of the side surface portions 15a of the chassis 15.

In the reverse surface of the tray portion 51 (i.e., the surface opposite to the surface where the placing recess 51a is provided), a first engaging recessed groove portion 51c1 is provided situated on the other side in the longitudinal direction (i.e., the left-hand side in FIGS. 2 and 3). The first engaging recessed groove portion 51c1 opens downwardly toward the back surface side along the longitudinal direction. As shown in FIGS. 2 to 4, 6 and 7, the first engaging recessed groove portion 51c1 is conditioned so as to open at the rear end portion of the disk tray 50. Specifically, the first engaging recessed groove portion 51c1 is conditioned so as to cause the guide ribs 15f1 to be engaged/disengaged with/from the opening at the end when the disk tray 50 advances/retreats. The width dimension of the first engaging recessed groove portion 51c1 is smaller than the width dimension that is the distance between the straight line connecting the forward ends of the first bulging portions 15h3 of the elastic guide portion 15h of the chassis 15 and the second bulging portion 15h4, and the width dimension of the first engaging recessed groove portion 51c1 is substantially equal to or slightly larger than the width dimension of the guide ribs 15f1. Then, the central portion of the elastic guide portion 15h is elastically deformed to in a small width so as to be curved in the direction in which the first bulging portions 15h3 protrude. Thereafter, the forward end portions of the first bulging portions 15h3 and the second bulging portion 15h4 slidably contact the inner wall surfaces of the first engaging recessed groove portion 51c1 so as to apply the restoring force of the elastic deformation to the inner wall surfaces of the portion 51c1 in the width direction. Accordingly the elastic guide portion 15h is engaged with the engaging recessed groove portion 51c1. Further, the guide ribs 15f1 of the chassis 15 are detachably engaged with the first engaging recessed groove portion 51c1 due to advancing/retreating movement of the disk tray 50. As a result, the disk tray 50 is movably guided without causing any rattling.

In the first engaging recessed groove portion 51c1, a relief recess 51c11 is provided on the front side of the tray portion 51 and the relief recess 51c11 opens in the width direction so as to expand in width. The relief recess 51c11 is provided at the position where the second bulging portion 15h4 of the elastic guide portion 15h is engaged therewith at the so-called home position. The home position is the processing position where the optical disk 200 transferred into the case body 10 by retreating of the disk tray 50 undergoes processing. In this state of engagement, the elastic deformation of the elastic guide portion 15h is released. As a result, a creep deformation, etc. of the elastic guide portion 15h can be suppressed even when, for example, the disk tray 50 is kept at the home position for a long period of time.

Further, in the back surface of the tray portion 51, a second engaging recessed groove portion 51c2 is provided on one longitudinal side and the second engaging recessed groove opens downwardly toward the back side along the longitudinal direction. The second engaging recessed groove 51c2 is substantially parallel to the first engaging recessed groove portion 51c1. Similarly to the first engaging recessed groove portion 51c1, the second engaging recessed groove portion 51c2 is open at the rear end of the disk tray 50. Specifically, when the disk tray 50 advances/retreats, the guide ribs 15f2 situated on the opposite side of the guide ribs 15f1 are engaged/disengaged with/from the opening at the end thereof. The second engaging recessed groove portion 51c2 is formed to be substantially equal to or slightly larger than the width dimension of the guide ribs 15f2. The guide ribs 15f2 are detachably engaged with the second engaging recessed groove portion 51c2 due to advancement/retreating movement of the disk tray 50, and the disk tray 50 is movably guided without causing any rattling.

On the back surface of the tray portion 51, there is provided a guide rib 51*d* in the form of a wall extending longitudinally along the opening edge of the first engaging recessed groove portion 51*c*1. On the inner side of the guide rib 51*d*, there is provided a longitudinally extending latch 51*d*1 so as to be situated below the first engaging recessed groove 51*c*1 without being situated under the first engaging recessed groove 51*c*1. The outer surface side of the guide rib 51*d* is formed so as to allow the guide ribs 15*f*2 on the guide rib 15*f*1 side to slidably contact. Further, in the back surface of the tray portion 51, there is provided a third engaging recessed groove portion 51*c*3 that opens downwards toward the back side, so as to be longitudinally bendable as appropriate.

Further, at the other end edge which is longitudinally on the rear side of the tray portion 51 and on one longitudinal side thereof (i.e., the right-hand side in FIGS. 2 and 3), specifically, in the rear end surface constituting the forward end portion when the disk tray 50 retreats, an engaging recess 51*e* as an engaging portion is formed by cutout, and the engaging recess 51*e* is capable of functioning also as a locking portion. As shown in FIGS. 2 to 4, the engaging recess 51*e* is formed as a recessed groove recessed backwards to be the same configuration in the thickness direction, with its axial direction being in the thickness direction of the tray portion 51. The engaging recess 51*e* has a substantially semi-circular recessed surface corresponding to the outer peripheral surface of the elastic restriction section 15*g* and the substantially semi-circular recessed surface has a width smaller than the diameter dimension of the elastic restriction section and larger than the diameter dimension thereof when it is elastically deformed with the forward ends of the elastic members 15*g*1 held in contact with each other. The opening edge of the engaging recess 51*e* is formed in an arcuate configuration so as to be widened backwards. In FIG. 4, the arrows indicate the forces absorbed by the elastic restriction section 15*g* in the advancing/retreating direction in which the disk tray 50 moves and in the width direction orthogonal thereto.

Then, as described above, the disk tray 50 is engaged with the first engaging recessed groove portion 51*c*1 with the elastic guide portion 15*h* elastically deformed. When the engagement is effected by the elastic guide portion 15*h*, the elastic portion 15*h*2 is elastically deformed so as to be curved in the direction in which the first bulging portions 15*h*3 bulge. As a result of the elastic deformation of the elastic portion 15*h*2 of the elastic guide portion 15*h*, a restoring force due to the elastic deformation is exerted such that the first bulging portions 15*h*3 and the second bulging portion 15*h*4 are held in press contact with the inner side surfaces of the first engaging recess 51*c*1 so as to prop up in mutually opposite directions substantially along the width direction of the first engaging recessed groove portion 51*c*1. As a result, in the disk tray 50, the movement in the width direction including the rotation around the engagement position of a movement gear 63 described below is absorbed by the elastic deformation of the elastic guide portion 15*h*. The guide ribs 15*f*1 are engaged with the first engaging recessed groove portion 51*c*1 while the guide ribs 15*f*2 are engaged with the second engaging recessed groove portion 51*c*2, and the guide ribs 15*f*2 substantially slidably contacts the outer side of the guide rib 51*d* to be engaged therewith. Due to these engagements and the restoring force caused by elastic deformation of the elastic guide portion 15*h*, the disk tray 50 is arranged in the chassis 15 to be movable in advancing and retreating direction while the movement of the disk tray is restricted in the width direction. The forward ends of the guide ribs 15*f*2 engaged with the first engaging recessed groove portion 51*c*1 is in sliding contact with the bottom surface of the first engaging recessed groove portion 51*c*1 while the forward ends of the guide ribs 15*f*2 substantially in sliding contact with the outer side of the guide rib 51*d* is in sliding contact with the lower surface of the guide flange portion 51*c*. Specifically, the disk tray 50 is placed on the two lines of guide ribs 15*f*2, with the upper surfaces of the guide flange portions 51*c* being engaged with (i.e., in sliding contact with) the lower surfaces of the restricting claws 15*i* to be opposed thereto. With this arrangement, the disk tray 50 is arranged in the chassis 15 so as to be capable of advancing and retreating while the movement of the disk tray is restricted in the vertical direction Then, as shown in FIGS. 1 to 3, an open/close drive unit 60 as moving unit for advancing/retreating the disk tray 50 is arranged on the chassis 15 to be situated at the opening/closing drive arrangement portion 15*d*. The open/close drive unit 60 has a drive transmission pulley 61, a drive transmission gear 62 engaged with the drive transmission pulley 61, and a movement gear 63 engaged with the drive transmission gear 62 and partially passed through the drive transmission through-hole 16 to be engaged with the latch 51*d*1 of the disk tray 50 without contacting the elastic guide portion 15*h*. The drive transmission pulley 61, the drive transmission gear 62, and the movement gear 63 are engaged with each other and rotatably supported by the opening/closing drive arrangement portion 15*d*. Specifically, the elastic guide portion 15*h* is formed so as to be astride the movement gear 63, with the first bulging portions 15*h*3 contacting one inner side surface of the first engaging recessed groove portion 51*c*1 on the front and rear sides in the advancing/retreating direction of the disk tray 50 relative to the engagement position of the movement gear 63. Then, between the space provided thereto, the second bulging portion 15*h*4 contacts the other inner side surface of the first engaging recessed groove portion 51*c*1 on the opposite side. The open/close drive unit 60 also includes an entrance/exit electric motor 64. A pulley 65 is provided integrally on an output shaft 64*a* of the entrance/exit electric motor 64. A looped belt 66 is stretched between the pulley 65 and the drive transmission pulley 61, and, the entrance/exit electric motor 64 is driven to rotate the pulley 65, the drive transmission pulley 61, the drive transmission gear 62, and the movement gear 63. Then, the disk tray 50 is moved through the window portion 13*a* of the decorative plate 13 movably in the advancing and retreating direction.

Further, the open/close drive unit 60 has a moving cam 68 on the opening/closing drive arrangement portion 15*d* of the chassis 15, and the moving cam 68 is arranged to be movable in the mutually opposing direction of the side surface portions 15*a*. The moving cam 68 is provided with a movement restricting rib 68*a* engaged with the third engaging recessed groove portion 15*c*3 of the disk tray, a movement latch 68*b* engaged with the movement gear 63, a substantially crank-like link groove portion (not shown) engaged with the rotation guide portion 22 which is integrally mounted to the base plate portion 21, etc. Then, when the drive transmission gear 62 is rotated by driving the entrance/exit electric moving motor 64, the movement cam 68 is moved in the width direction of the chassis 15 by the rotation of the movement gear 63, and the rotation guide portion 22 slides (i.e., moves relatively) in the link groove portion engaged with the rotation guide portion 22. With this arrangement, the base 21 is rotated in the vertical direction, which is the axial direction of the chassis 15. It should be noted that the movement cam 68 rotates the base 21 upwardly, with the disk tray 50 retracted to be situated inside the chassis 15. When the disk tray 50 is advanced/retreated, the base 21 is downwardly rotated so that the main body 20 is retracted from the advancing/retreating path of the disk tray 50, thereby avoiding interference with the disk tray 50.

As the base 21 rotates downwardly, the movement restricting rib 68a of the movement cam 68 slides (i.e., moves relatively) within the third engaging recessed groove portion 15c3 of the disk tray 50 with which it is engaged. Then the disk tray 50 advances to some degree. When the drive transmission gear 62 rotates, the movement latch 68b is disengaged from the movement gear 63, and the movement of the movement cam 68 stops, such that the disk tray 50 engaged with the movement gear 63 advances. Conversely, when the disk tray 50 is retracted and moved to the home position, the movement restricting rib 68a is moved by the third engaging recessed groove portion 15c3, and the movement latch 68b is engaged with the movement gear 63 again, such that the base 21 is rotate upwardly.

The main body 20 is formed by the disk rotation driver 25, the processor moving unit 30, the recording/reproducing section 40, and the open/close drive unit 60 described above.

The chassis 15 is provided with a rotor support member 17, which is a support member as a covering member fixed in a position by screws to bridge the side surface portions 15a. As shown in FIG. 1, the rotor support member 17 is formed, for example, by a pressed metal plate, and formed in a substantially thin-plate-like configuration with its peripheral edge being inclined so as to be widened on one side. Then, one edge of the rotor support member 17 is formed in an arcuate configuration corresponding to the placing recess 51a of the disk tray 50, and substantially covers the placing recess 51a to define the housing space 18 housing the optical disk 200. The rotor support member 17 also has a support recess 17a substantially at the center thereof, which substantially coincides with the center of the arcuate one edge, and the support recess 17a is directed upwardly and situated at a position opposed to the turntable 27 of the disk rotation driver 25. A support hole 17b is formed substantially at the center of the support recess 17a. A rotor 29 as the other holding member is rotatably placed on the support recess 17a of the rotor support member 17. Then, the rotor 29 is substantially of a disc-like configuration, and its outer peripheral edge is arranged to be engaged with the peripheral edge of the support hole 17b. A magnetic material (not shown) such as a metal plate is integrally mounted to the rotor 29, and the rotor 29 is attracted to the turntable 27 by the magnetic force of the magnet of the turntable 27, holding the optical disk 200 between itself and the turntable 27.

As shown in FIG. 1, a circuit board 70 is mounted to the chassis 15. The circuit board 70 is detachably mounted by means of a board mounting claw portion (not shown) provided on the chassis 15. The circuit board 70 is formed as a flat plate of substantially the same size as the lower case 12 of the casing 10, and is mounted so as to close the lower side of the chassis 15 so that the main body 20 is covered. The circuit board 70 is provided with a control circuit for controlling the operation of the main body 20.

[Operation of Disk Drive]

Next, the operation of the disk drive 100 of the above-mentioned embodiment will be illustrated.

First, electric power is supplied to the disk drive 100. Then, the user operates the switch operating portion 13b of the decorative plate 13. Through this operation of the switch operating portion 13b, a switch (not shown) provided on the circuit board 70 is turned on and off, and the control circuit of the circuit board 70 drives the entrance/exit electric motor 64 of the open/close drive unit 60. The entrance/exit electric moving motor 64 is driven, so that the pulley 65, the drive transmission pulley 61, the drive transmission gear 62, and the movement gear 63 are rotated, and the disk tray 50 whose latch 51d1 is engaged with the movement gear 63 is moved in the advancing direction from the window portion 13a of the decorative plate 13. At the time of this movement, the movement cam 68 of the open/close drive unit 60 is also moved, and the base seat 21 whose rotation drive portion 22 is engaged with the cam 68 is moved downwardly to rotate the main body 20 downwardly, such that the main body 20 retreats from the advancing path of the disk tray 50 and stays aloof for the avoidance of an interference therewith.

When the disk tray 50 advances, the engaging recess 51e which elastically deforms the elastic restriction section 15g of the chassis 15 to be engaged therewith is disengaged from the engaging recess 51e. The elastic guide portion 15h is engaged with the first engaging recessed groove portion 51c1, applying a restoring force due to elastic deformation thereto so that the gap between the inner walls of the first engaging recessed groove portion 51c1 is widened. Accordingly, the reaction force that rotates the disk tray 50 using the rotation of the movement gear 63 and the vibration of the disk tray 50 in the width direction due to its movement are offset by the restoring force to be absorbed by the elastic guide portion 15h. Thus, the disk tray 50 is moved guided by the elastic guide portion 15h in a stable manner.

The optical disk 200 is placed on the placing recess 51a of the disk tray 50 having been advanced, with the recording surface of the optical disk 200 facing downwards. After that, the switch operating portion 13b of the decorative plate 13 is operated again to rotate the entrance/exit electric motor 64 of the open/close drive unit 60, and the disk tray 50 is retracted into the window portion 13a to be placed at the home position. At the time of this retreating of the disk tray 50, the base 21 whose rotation guide portion 22 is engaged with the movement cam 68 moved by the movement gear 63 is rotated upwardly, and the main body 20 staying aloof below is brought to the recording/reproducing position with the pickup 42 being opposed to the optical disk 200. As a result of this upward rotation of the main body 20, the rotation shaft 27a of the turntable 27 of the disk rotation driver 25 is fitted into the axial hole 210 of the optical disk 200. In addition, due to the magnetic force of the magnet of the turntable 27, the optical disk 200 is held and fixed between the turntable 27 and the rotor 29. In this holding state, the rotor 29 is slightly raised from the rotor support member 17, and is kept out of contact with the rotor support member 17.

Immediately before the disk tray 50 is retreated to the home position, the outer surface of the elastic restriction section 15g abuts the recessed surface of the engaging recess 51e of the disk tray 50, and the elastic members 15g1 are elastically deformed such that the elastic members 15g1 falls inwardly so as to reduce the diameter of the elastic restriction section 15g. Then, with the disk tray 50 remaining retreated to the home position, the elastic members 15g1 radially apply a restoring force caused by the elastic deformation to the outer periphery of the engaging recess 51e. As a result, the movement of the disk tray 50 situated at the home position is restricted by the restoring force due to the elastic deformation of the elastic guide portion 15h and the elastic restriction section 15g which are arranged at substantially diagonal positions of the disk tray 50.

In this state, the control circuit of the circuit board 70 controls the main body 20, and rotates the optical disk 200 as appropriate by the electric rotation motor 26 of the disk rotation driver 25. At the same time, the pickup 42 of the recording/reproducing section 40 is moved as appropriate along the recording surface by the processor moving unit 30. Then, the reading processing to read recorded information or the recording processing to record information is operated. Even when the rotation of the optical disk 200 generate a vibration in the disk tray 50, the vibration is offset by the restoring force of the elastic restriction section 15g and the elastic guide portion 15h, thereby suppressing generation of noise from the vibration. Specifically, the movement gear 63 is engaged with the latch 51d1 at the home position to allow the disk tray to be advanced and retreated. With this arrangement, due to the clearance in the engagement state of the guide ribs 15f1, 15f2 and the clearance in the engagement state of the movement gear 63, the following states are likely to occur: a state in which rotation is effected around the engagement position of the movement gear 63, a state in which the disk tray 50 moves in the width direction, and a state in which the disk tray 50 is moved in the advancing/retreating direction. Even when an external force causing rotation or movement in the advancing/retreating direction is applied due to vibration, the elastic restriction section 15g can be elastically deformed such that a restoring force is applied in a plurality of different directions due to the elastic members 15g1. As a result, the external force is absorbed by the elastic restriction section 15g, and the vibration of the disk tray 50 is suppressed, thereby suppressing noise due to vibration.

[Positive Effects of Disk Drive]

As described above, in the above-mentioned embodiment, the elastic restriction section 15g to be detachably engaged with the recess 51e provided in the disk tray 50 is provided in the chassis 15 of the case body 10, such that a restoring force due to elastic deformation is applied to the disk tray 50 relative to the case body 10 in the advancing/retreating direction of the disk tray 50 and in the width direction which is at least one of the directions crossing the advancing/retreating direction, when the disk tray 50 is retracted into the case body 10 to be placed at the home position at the main body 20 in the case body 10, where reading processing or recording processing is operated on the optical disk 200. Thus, even when, for example, vibration generated at the time of reading processing or recording processing by the main body 20 is applied to the disk tray 50, the vibration is absorbed by the elastic deformation of the elastic restriction section 15g, whereby enabling the suppression of the vibration of the disk tray 50. As a result, a good reading and recording processing is realized, in which generation of noise due to vibration can be suppressed.

In particular, the above-mentioned embodiment is applied to the disk drive 100 that performs reading or recording processing on the optical disk 200. Specifically, the embodiment is applied to an arrangement in which vibration of the disk tray 50 which arises in transferring the optical disk 200 rotating at high speed is absorbed. Thus, the noise due to vibration which is likely to be generated by the high speed rotation of the optical disk 200 can be satisfactorily suppressed.

Then, the disk tray 50 is provided with the recessed engaging recess 51e, and the chassis 15 is provided with the elastic restriction section 15g having an outer peripheral surface which has a convex surface corresponding to the concave surface of the engaging recess 51e. Thus, an arrangement that enables elastic deformation to apply a restoring force in different directions can be easily realized, and the arrangement simplified in the above manner enables a productivity improvement and a cost reduction.

In particular, the disk tray 50 is provided with the concave engaging recess 51e, and the chassis 15 is provided with the protruding elastic restriction section 15g in the arrangement. Thus, the elastic restriction section 15g can be formed integrally with the chassis 15 with ease, thereby contributing to an easy realization of an arrangement in which vibration is absorbed without utilizing any separate structure. Accordingly, a further productivity improvement and a cost reduction are easily realized.

The elastic restriction section 15g protrudes such that its axial direction is substantially orthogonal to the plane of the disk tray 50 (that is, orthogonal to the plane of the optical disk 200 transferred by the disk tray 50). Thus, the disk tray 50 is formed in a substantially rectangular-plate-like thin configuration as a configuration for transferring the optical disk 200 of a disc-like thin member. With this arrangement, the engaging recess 51e is formed in a groove-like fashion along the thickness direction of the disk tray 50, thereby further reducing the size of an arrangement in which vibration is absorbed in different directions. Thus, downsizing of the arrangement and an improvement in productivity, etc can be easily attained.

Then, the elastic restriction section 15g is provided to protrude over the advancing/retreating path of the disk tray 50, and the engaging recess 51e is provided in the rear end surface which constitutes the forward end portion of the disk tray 50 at the time of retreating. Thus, without using any separate structure, a simplified arrangement in which vibration of the disk tray 50 is absorbed at the home position where reading processing or recording processing is performed can be easily realized.

The elastic restriction section 15g is formed as a cylindrical member protruding such that its axial direction is substantially orthogonal to the advancing/retreating direction of the disk tray 50, (i.e., substantially orthogonal to the plane of the disk tray 50), with its forward end being a free end, and the engaging recess 51e is formed as a recessed groove vertically extending in correspondence with the axial direction of the elastic restriction section 15g. Thus, without using any separate structure, an simplified arrangement in which vibration applied in different directions is absorbed can be realized.

The elastic restriction section 15g is divided into three elastic members 15g1. Thus, without using any separate elastic member, a simplified arrangement in which a restoring force of elastic deformation is applied and vibration applied in different directions can be absorbed is easily realized. Even in an arrangement in which the elastic restriction section is formed integrally with the chassis 15, when the chassis 15 is formed of a elastic material such as a synthetic resin, for example, ABS, an arrangement in which a restoring force of elastic deformation can be applied is easily realized.

Then, the elastic restriction section 15g is divided into the elastic members 15g1 such that one of the elastic members 15g1 is situated so as to be opposed to the rear end surface constituting the forward end portion of the advancing/retreating disk tray 50. Thus, because the elastic restriction section 15g is divided into the elastic members 15g1, an arrangement can be obtained in which not only vibration in the advancing/retreating direction is absorbed but also vibration in the other directions than the advancing/retreating direction, (i.e., vibration applied in the rotation direction around the engagement position of the movement gear 63 crossing the advancing/retreating direction) can be absorbed.

Further, the elastic restriction section 15g protrudes to be engaged with the engaging recess 51e at a position opposite to the position where the movement gear 63 causing advancement/retreating is engaged with the disk tray 50, in particular, at a substantially diagonal position spaced apart therefrom. Thus, an arrangement can be easily obtained in which any applied vibration can be more reliably absorbed with small force. Thus, the magnitude of the restoring force due to elastic deformation to be applied can be set at a low level. Accordingly, even a simple arrangement in which the elastic restriction section 15g to be elastically deformed is divided into three can be used for the purpose, and an arrangement simplification and a size reduction can be easily obtained. The engagement/disengagement of the engaging recess 51e and the elastic restriction section 15g at the time of advancing/retreating of the disk tray 50 can be effected with small force, thereby realizing a smooth advancement and retreat.

The rattling of the disk tray 50 while moving is suppressed by the elastic guide portion 15h. Thus, when the disk tray 50 is at a position other than the home position, vibration can be suppressed, and a more reliable suppression of vibration is enabled.

[Modifications of Embodiment]

The present invention is not limited to the above-mentioned embodiment but shall include such modifications as to attain the object of the present invention, as exemplarily shown below.

Specifically, the processing device of the present invention is not limited to the arrangement as described above in which the optical disk 200 is used. The present invention is also applicable to a disk drive 100 for processing any disc recording medium adapted to reproduce or record information optically, magnetically, etc., for example, a magnetic disk or a magneto-optical disk. Further, the recording medium is not restricted to a disc recording medium. The present invention is also applicable to any drive for processing a recording medium of any configuration, such as a cylindrical recording medium having a recording surface on the outer peripheral surface thereof. The present invention is further applicable to a machine tool or an apparatus for surface treatment such as coating. Such a machine or apparatus preferably may include an arrangement for transferring an object to be transferred to a position where a processing operation is to be performed, specifically, an arrangement in which the movement of a transfer unit in a transfer apparatus for transferring an object to be transferred is restricted.

Figure 8:
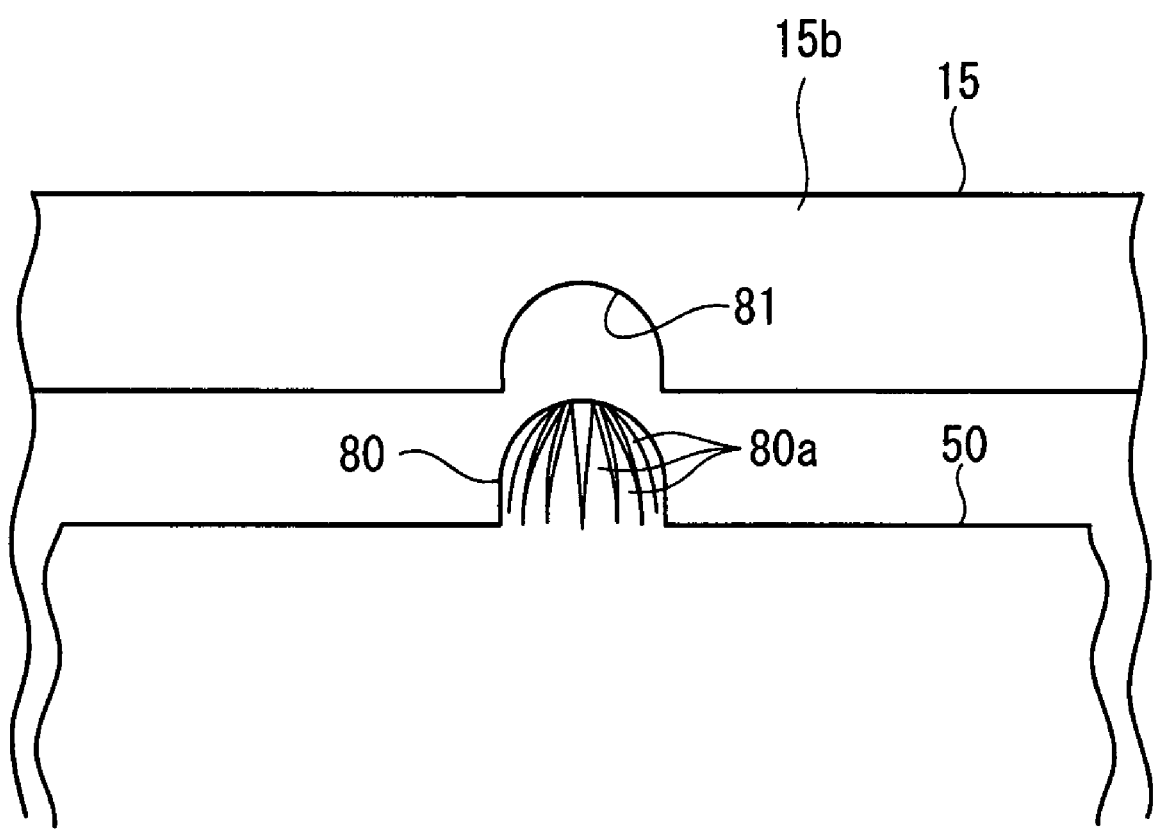
FIG. 8 is a partially cutaway plan view schematically showing the arrangement of an engaging portion according to a second embodiment of the present invention and a region adjacent to a locking portion.
Figure 9A:
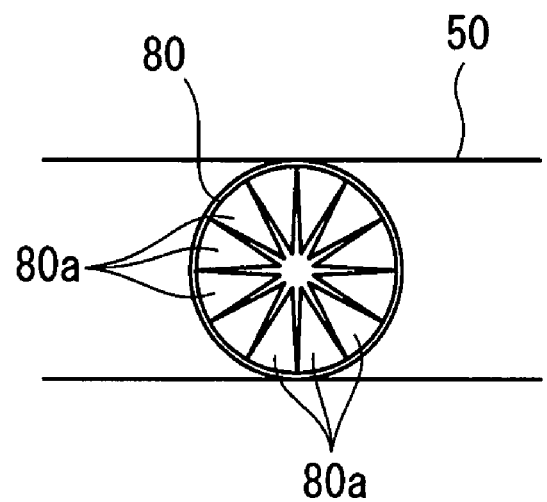
FIG. 9A is a partially cutaway end view schematically showing the arrangement of the locking portion according to the second embodiment, showing the region adjacent to the locking portion prior to engagement.
Figure 9B:
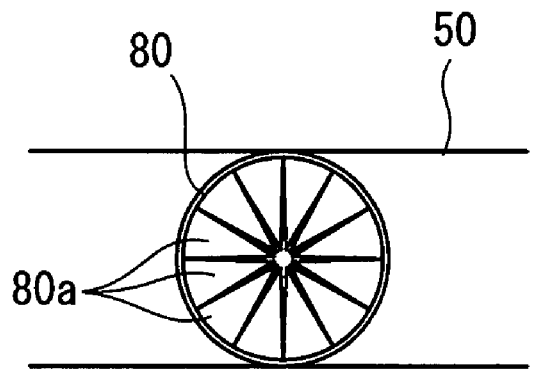
FIG. 9B is a partially cutaway end view schematically showing the arrangement of the locking portion according to the second embodiment, showing the region adjacent to the locking portion in the engaged state.

In the above-mentioned embodiment, the engaging recess 51e which is an engaging portion formed in a concave configuration is provided in the disk tray 50 as the transfer unit, and the elastic restriction section 15g which is a convex locking portion is provided on the chassis 15 forming the case body 10. However, a reversed construction is also adoptable in which a convex locking portion is formed on the disk tray 50 while a concave engaging portion to be engaged with the convex locking portion is provided in the chassis 15. Specifically, as shown in FIG. 8, instead of the engaging recess 51e, an elastic restriction section 80 as a locking portion is formed in the disk tray 50 so as to protrude rearwards. Then, an engaging recess 81 to be engaged with the elastic restriction section 80 when the disk tray 50 is at the home position is provided in the end surface portion 15b of the chassis 15. As shown in FIGS. 8 and 9A, the elastic restriction section 80 is formed, for example, in a substantially semi-spherical dome-like configuration, and has a plurality of elastic members 80a which are elastically deformable inwardly with its forward end portion being reduced in diameter. The engaging recess 81 is of a substantially semi-spherical concave configuration, and has a depth smaller than the outer dimension of the elastic restriction section 80. The engaging recess 81 is formed in a concave configuration that allows the elastic members 80a of the elastic restriction section 80 to be elastically deformed inwardly. The concave configuration corresponds to the outer configuration of the elastic restriction section 80 in a state where the elastic restriction section 80 has been elastically deformed to a degree that the elastic members 80a are not brought into contact with each other. Specifically, as shown in FIG. 9B, the elastic restriction section 80 is configured so as to be engaged with the engaging recess 81 when the disk tray 50 is at the home position such that the elastic portions 80a are inwardly elastically deformed to a degree not to contact each other. As a result, similarly to the above-mentioned embodiment, vibration applied in different directions is reliably absorbed, thus suppressing vibration of the disk tray 50.

Figure 10:
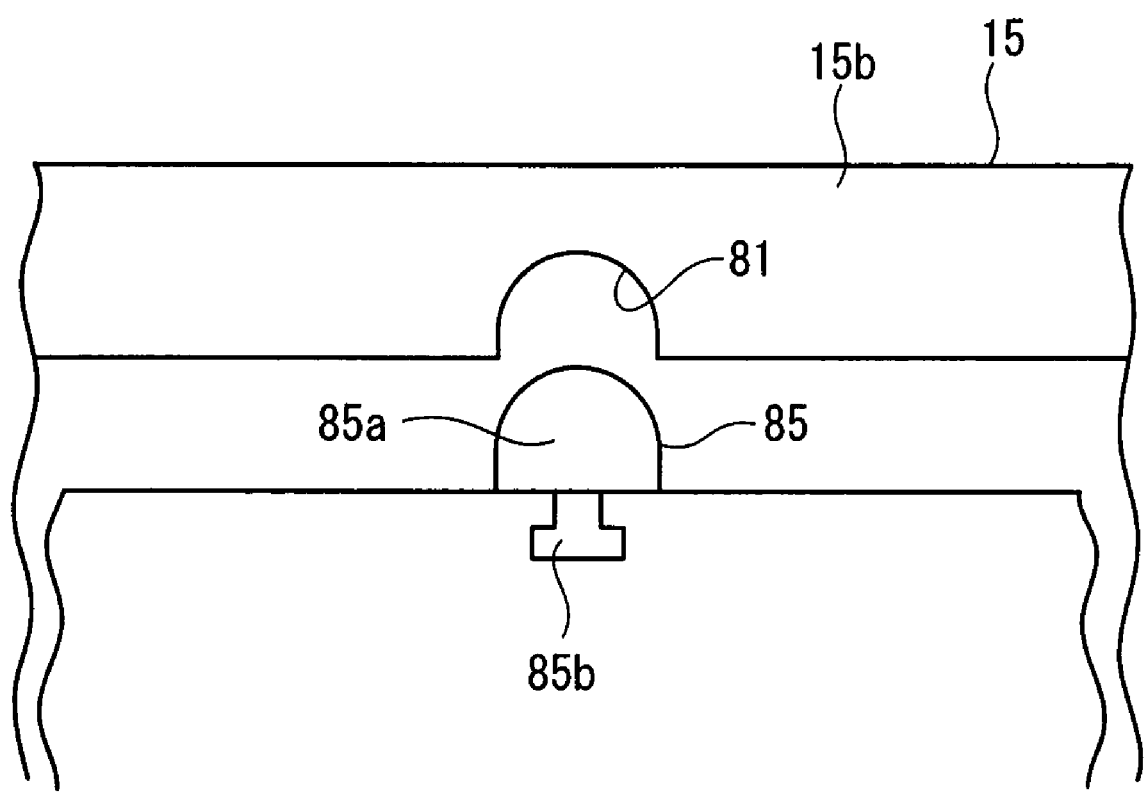
FIG. 10 is a partially cutaway plan view schematically showing the arrangement of a region adjacent to an engaging portion and a locking portion according to a third embodiment of the present invention.

As the elastic restriction section 80 of the embodiment shown in FIGS. 8, 9A, and 9B, an elastic restricting member 85 formed of an elastic material such as rubber as shown, for example, in FIG. 10, can be attached to the disk tray 50. The elastic restricting member 85 is configured so that a locking portion 85a protruding in a substantially semi-spherical configuration is continuously formed with a mounting portion 85b mounted to the disk tray 50. Solely by mounting the elastic restricting member 85 separately formed of an elastic material, an arrangement for vibration absorption can be also adoptable in a transfer unit which is formed of metal or the like and which cannot be formed of an elastic material like synthetic resin such as ABS, as in the case of the disk tray 50.

While in the above description the elastic restriction section 15g divided into three is formed integrally with the chassis 15, as in the case of the elastic restricting member 85 shown in FIG. 10, a separately formed elastic restriction section can be mounted to another position of the chassis 15 or the case body 10. With this arrangement, an arrangement for vibration absorption also can be adopted when, for example, the case body is formed of metal and cannot be formed of an elastic material like synthetic resin such as ABS.

Figure 11:
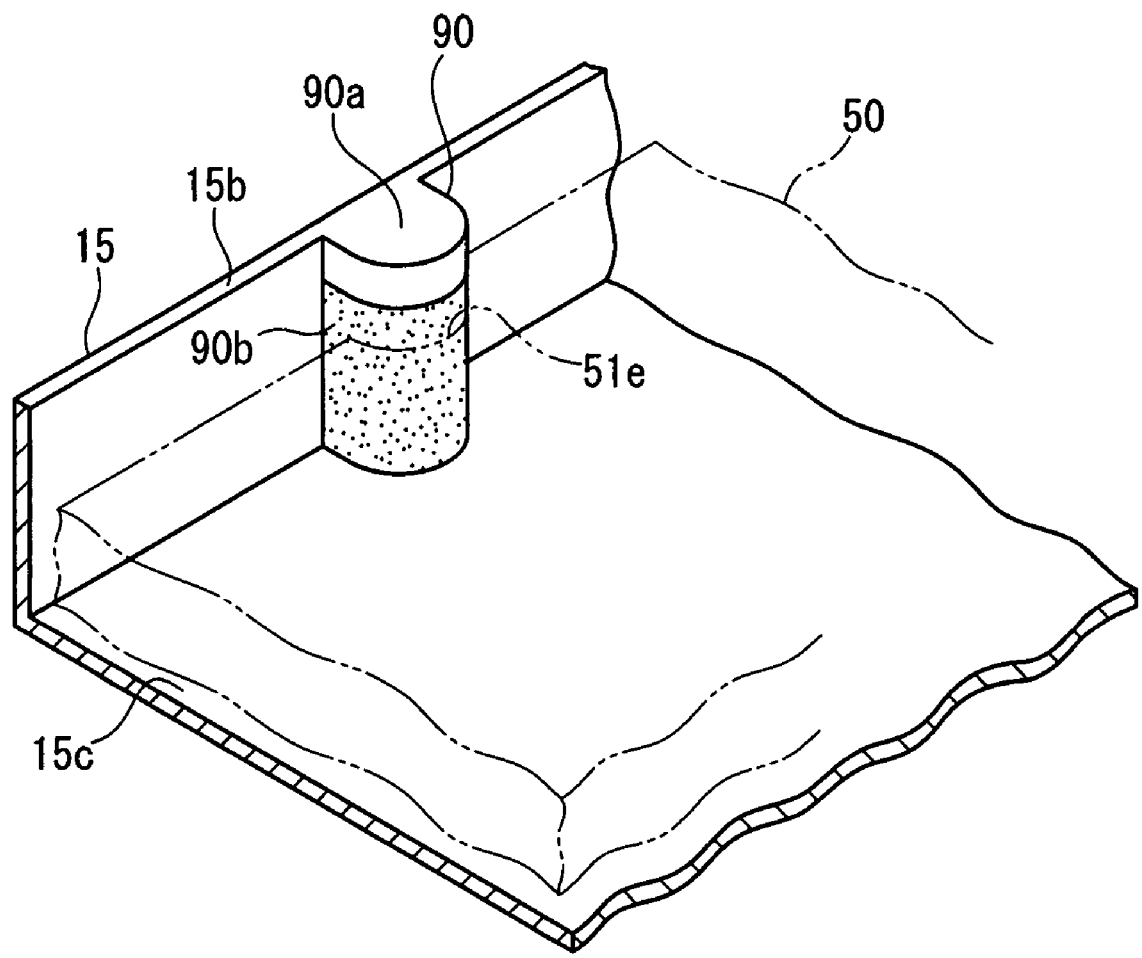
FIG. 11 is a partially cutaway perspective view schematically showing the arrangement of the region adjacent to the engaging portion and the locking portion according to the third embodiment of the present invention.

In addition, the number of portions into which the elastic restriction section is divided is not restricted to three but may be more than three. As shown, for example, in FIG. 11, in order to form a locking portion 90 a soft material 90b which is made of an elastic material such as rubber or urethane foam can be attached to the outer peripheral surface of a mounting protrusion 90a formed in a semi-columnar configuration. The arrangement of FIG. 11 can be modified such that it protrudes in a columnar form as stated above. In the arrangement shown, for example, in FIG. 11, to reverse the protrusion/recess relationship of the construction shown in FIG. 10, a locking portion in the form of an elastic member protruding in the advancing/retreating direction can be provided on the end surface portion 15b of the chassis 15, and a recessed engaging portion corresponding to the configuration of the locking portion can be provided to the disk tray 50.

Figure 12A:
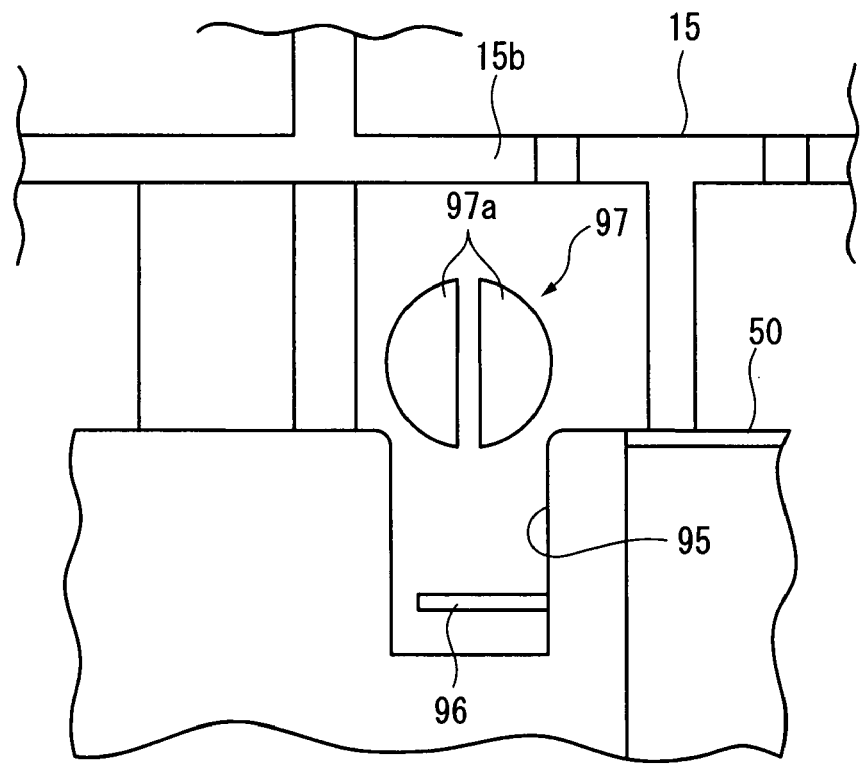
FIG. 12A is a partially cutaway plan view schematically showing the arrangement of the region adjacent to the engaging portion and the locking portion according to the third embodiment of the present invention, showing the state prior to engagement.
Figure 12B:
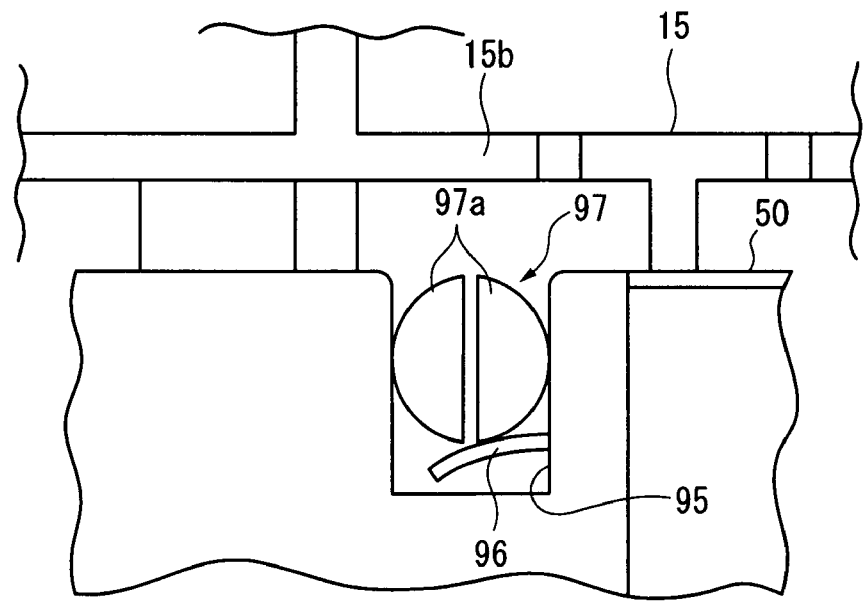
FIG. 12B is a partially cutaway plan view schematically showing the arrangement of the region adjacent to the engaging portion and the locking portion according to the third embodiment of the present invention, showing the engaged state.

While the elastic restriction section 15g is formed as the locking portion in a state that a restoring force is applied in different directions, it is also possible to provide the engaging portion with an arrangement in which a restoring force due to elastic deformation is applied to the locking portion (i.e., arrangement in which a restoring force due to elastic deformation is applied respectively to the locking portion and the engaging portion). For example, as shown in FIG. 12A, an elastic tongue portion 96 as an elastic member having its axial direction in the width direction and elastically deformable in the advancing/retreating direction of the disk tray 50 is provided in a protruding configuration in an engaging recess 95 provided in the disk tray 50. As a locking portion, the chassis 15 is provided with an elastic restriction section 97 in a protruding configuration which is dividable into two elastic members 97a and elastically deformable in a direction corresponding to the width direction of the engaging recess 95, (i.e., a direction crossing the advancing/retreating direction of the disk tray 50). Further, as shown in FIG. 12B, with the disk tray 50 retracted to the home position, the elastic restriction section 97 elastically deforms the elastic tongue portion 96, and the elastic restriction section 97 is elastically deformed such that the elastic members 97a are close to each other. As a result of the engagement, a restoring force due to elastic deformation is applied in the advancing/retreating direction of the disk tray 50 and in the width direction crossing the advancing/retreating direction. Accordingly, as in the above-mentioned embodiment, vibration can be suppressed without using any separate member. The elastic member provided in the engaging portion is not restricted to the tongue-shaped member such as the elastic tongue portion 96. An elastic member of any configuration is adoptable to apply a restoring force due to elastic deformation in the advancing/retreating direction of the disk tray 50.

In addition, while in the above-mentioned embodiment the pair of the engaging recesses 51e to be engaged with the elastic restriction section 15g are provided, the engaging recess 51e can be provided in a plurality of pairs, and for example, two pairs can be provided so as to be situated in the vicinity of both sides of the rear end surface of the disk tray 50. With this arrangement, vibration can be suppressed more reliably. Furthermore, in the case of the arrangement in which a plurality of pairs of engaging recesses are provided, one pair can absorb a vibration applied in one direction while the other pair absorb a vibration applied in a different direction so that a restoring force due to elastic deformation can be applied in different directions by using a plurality of pairs of engaging recesses.

While in the above-mentioned embodiment the elastic guide portion 15h is provided to restrict the movement of the disk tray 50 by also applying a restoring force due to elastic deformation of the elastic guide portion 15, an arrangement in which no elastic guide portion 15h is provided can be also adoptable. Additionally, it is also possible to effect movement restriction with another arrangement.

While in the above description the relief recess 51c11 is provided in the first engaging recessed groove portion 51c1, it is also possible to adopt an arrangement in which instead of providing the relief recess 51c11, the elastic guide portion 15h is engaged with the first engaging recessed groove portion 51c1 while elastically deformed even when the disk tray 50 is at the home position. With this arrangement, for example, it is possible to suppress movement in the width direction and the advancing/retreating direction due to vibration at the home position, so that vibration can be more reliably suppressed at the home position, thereby suppressing noise due to vibration and stabilizing the processing. Further, the relief recess 51c1 is not restricted to the above-mentioned arrangement in which the second bulging portion 15h4 is engaged. For example, it is also possible to cancel elastic deformation when engaged with the first bulging portion 15h4, or to cancel elastic deformation when both are engaged with each other.

In addition, the specific structure and procedures for carrying out the present invention can be modified as appropriate to some other construction, etc. as long as the object of the present invention can be achieved.

[Effects of Embodiment]

As described above, the chassis 15 is provided with the elastic restriction section 15g to be detachably engaged with the engaging recess 51e provided in the disk tray 50 such that, when the disk tray 50 is at the home position where reading processing or recording processing is performed on the optical disk 200 by the main portion 20 arranged on the chassis 15, a restoring force due to elastic deformation is applied to the disk tray 50 with respect to the case body 10 in the advancing/retreating direction of the disk tray 50 and in at least one direction crossing this advancing/retreating direction. Thus, when vibration generated, for example, during reading processing or recording processing by the main body 20 is applied to the disk tray 50, the vibration is absorbed by elastic deformation of the elastic restriction section 15g, thereby suppressing vibration of the disk tray 50.

INDUSTRIAL APPLICABILITY

The present invention is applicable to a movement restriction device, a movement restriction method, and a processing device for restricting movement of a movable transfer unit that transfers an object to be transferred, such that a processing portion arranged on a chassis processes the object.

What is claimed is:

1. A movement restriction device that restricts movement of a transfer unit when the transfer unit is moved onto a chassis, the movement restriction device being provided in a processing device, the processing device comprising: the chassis; the transfer unit movably arranged on the chassis and adapted to transfer an object to be transferred onto the chassis; and a processing portion arranged on the chassis to process the object to be transferred that has been transferred onto the chassis by the transfer unit, the movement restriction device comprising:
an engaging portion provided in either one of the chassis or the transfer unit; and
a locking portion provided on the other one of the chassis or the transfer unit, the locking portion being detachably engaged with the engaging portion such that a restoring force due to elastic deformation is applied to the transfer unit relative to the chassis in a moving direction of the transfer unit and in at least one direction crossing the moving direction, when the transfer unit is moved to a processing position where the object to be transferred can be processed by the processing portion, the locking portion restricting the movement of the transfer unit relative to the chassis, wherein
the engaging portion applies a restoring force due to elastic deformation at least either in the moving direction of the transfer unit or in at least one of directions crossing the moving direction, while the engaging portion is engaged with the locking portion, and
the locking portion applies a restoring force due to elastic deformation in a direction different from the direction in which the engaging portion applies the restoring force due to the elastic deformation, while the locking portion is engaged with the engaging portion.

2. The movement restriction device according to claim 1, wherein
either one of the engaging portion or the locking portion has a concave surface, and
the other one of the engaging portion or the locking portion has a convex surface corresponding to the concave surface.

3. A movement restriction device according to claim 1, wherein
the engaging portion is formed in a concave configuration and provided in the transfer unit, and
the locking portion is provided to protrude from the chassis so that the locking portion can be engaged with the engaging portion.

4. A movement restriction device according to claim 3, wherein
the locking portion is provided to protrude into a movement path in which the transfer unit moves, and the engaging portion is provided at a forward end portion of the transfer unit when the transfer unit is moved to the processing position.

5. A movement restriction device according to claim 3, wherein the locking portion is provided to protrude and formed in a column shape, the column shape having an axial direction along a direction crossing the moving direction of the transfer unit, a forward end of the column shape being a free end, and the engaging portion is formed as a recessed groove along a direction corresponding to the axial direction of the locking portion.

6. A movement restriction device according to claim 5, wherein the locking portion is formed in a substantially cylindrical configuration, the locking portion being divided into at least three portions in a peripheral direction.

7. A movement restriction device according to claim 6, wherein the locking portion is divided in a positional relationship such that at least one portion thereof resulting from the division is opposed to the forward end portion of the transfer unit when the transfer unit is moved to the processing position.

8. A movement restriction device according to claim 3, wherein the engaging portion has an elastic member protruding inwardly, the elastic member being elastically deformed in the moving direction of the transfer unit, the elastic member being adapted to be elastically deformed while the elastic member is engaged with the locking portion, and the locking portion is provided so that the locking portion is elastically deformed in at least one direction crossing the moving direction of the transfer unit while the locking portion is engaged with the engaging portion.

9. A movement restriction device according to claim 3, wherein at least a part of the chassis is formed of an elastic material.

10. A processing device, comprising:

a chassis;

a transfer unit movably arranged inside the chassis and adapted to transfer an object to be transferred into and out of the chassis;

a processing portion arranged inside the chassis and adapted to process the object to be transferred that has been transferred into the chassis; and a movement restriction device that restricts movement of a transfer unit when the transfer unit is moved onto a chassis, the movement restriction device comprising:

an engaging portion provided in either one of the chassis or the transfer unit; and a locking portion provided on the other one of the chassis or the transfer unit, the locking portion being detachably engaged with the engaging portion such that a restoring force due to elastic deformation is applied to the transfer unit relative to the chassis in a moving direction of the transfer unit and in at least one direction crossing the moving direction, when the transfer unit is moved to a processing position where the object to be transferred can be processed by the processing portion, the locking portion restricting the movement of the transfer unit relative to the chassis, wherein the engaging portion applies a restoring force due to elastic deformation at least either in the moving direction of the transfer unit or in at least one of directions crossing the moving direction, while the engaging portion is engaged with the locking portion, and the locking portion applies a restoring force due to elastic deformation in a direction different from the direction in which the engaging portion applies the restoring force due to the elastic deformation, while the locking portion is engaged with the engaging portion.

11. A movement restriction method that restricts movement of a transfer unit when the transfer unit is moved onto a chassis of a processing device, the processing device comprising: the chassis; the transfer unit movably arranged on the chassis and adapted to transfer an object to be transferred onto the chassis: a processing portion arranged on the chassis to process the object to be transferred that has been transferred onto the chassis by the transfer unit; an engaging portion provided either to the chassis or the transfer unit; a locking portion provided the other one of the chassis or the transfer unit, the locking portion being detachably engaged with the engaging portion such that restoring force due to elastic deformation is applied to the transfer unit relative to the chassis, the movement restriction method comprising steps of; engaging the locking portion with the engaging portion in a state where the transfer unit has moved the object to be transferred to a processing position on the chassis at which the object to be transferred is processed by the processing portion; applying a restoring force due to elastic deformation by the engaging portion at least either in a moving direction of the transfer unit or in at least one direction crossing the moving direction; applying a restoring force due to elastic deformation by the locking portion in a different direction from the direction of the restoring force due to the elastic deformation by the engaging portion; and restricting the movement of the transfer unit relative to the chassis.

* * * * *